(12) United States Patent
Zubiria Elizondo et al.

(10) Patent No.: US 12,186,962 B2
(45) Date of Patent: Jan. 7, 2025

(54) PROCESS FOR OBTAINING A METAL-FREE COEXTRUDED BI-ORIENTED OF 7 LAYERS FILM FOR PACKAGING BY TRIPLE-BUBBLE PROCESS USED FOR STERILIZATION PROCESSES UP TO 135° C

(71) Applicant: ZUBEX INDUSTRIAL SA DE CV, Monterrey (MX)

(72) Inventors: Miguel Jorge Zubiria Elizondo, Monterrey (MX); Gabriel Santos Ruiz, Queretaro (MX); Juan Jose Valadez Lopez, Apodaca (MX)

(73) Assignee: ZUBEX INDUSTRIAL SA DE CV, Monterrey (MX)

( * ) Notice: Subject to any disclaimer, the term of this patent is extended or adjusted under 35 U.S.C. 154(b) by 0 days.

(21) Appl. No.: 17/553,316

(22) Filed: Dec. 16, 2021

(65) Prior Publication Data
US 2023/0073804 A1    Mar. 9, 2023

(30) Foreign Application Priority Data

Sep. 8, 2021 (MX) .................... MX/a/2021/010873

(51) Int. Cl.
*B32B 27/34* (2006.01)
*B29C 48/00* (2019.01)
(Continued)

(52) U.S. Cl.
CPC ........ *B29C 48/022* (2019.02); *B29C 48/0018* (2019.02); *B29C 48/10* (2019.02);
(Continued)

(58) Field of Classification Search
CPC ... B29C 48/022; B29C 48/0018; B29C 48/10; B29C 48/21; B29C 48/9105;
(Continued)

(56) References Cited

U.S. PATENT DOCUMENTS

| 6,270,869 B1 | 8/2001 | Zeiter |
| 6,726,363 B1 | 4/2004 | Marbler |

(Continued)

FOREIGN PATENT DOCUMENTS

| CN | 111453169 | 7/2020 |
| CN | 211544435 | 9/2020 |

(Continued)

OTHER PUBLICATIONS

"Additive." Vocabulary.com Dictionary, Vocabulary.com, https://www.vocabulary.com/dictionary/additive. Accessed Oct. 6, 2023. (Year: 2023).*

(Continued)

*Primary Examiner* — John D Freeman
(74) *Attorney, Agent, or Firm* — Defillo & Associates, Inc.; Evelyn A. Defillo

(57) ABSTRACT

The invention provides a process of obtaining a bi-oriented co-extruded film of 7 layers by triple bubble process for autoclave sterilization processes, which unlike the current existing materials for food sterilization, the invention does not require an individual manufacturing process of each sheet and subsequent lamination, but it is manufactured in a single step, in addition no metal compound is included in its composition, and provides a shelf life of more than a year in food products that are packaged in the process of sterilization (retort) inside the film.

11 Claims, 8 Drawing Sheets

(51) Int. Cl.
*B29C 48/10* (2019.01)
*B29C 48/21* (2019.01)
*B32B 1/08* (2006.01)
*B32B 27/08* (2006.01)
*B32B 27/18* (2006.01)
*B32B 27/30* (2006.01)
*B32B 27/32* (2006.01)
*B29K 23/00* (2006.01)
*B29K 105/00* (2006.01)

(52) U.S. Cl.
CPC ............. *B29C 48/21* (2019.02); *B32B 1/08* (2013.01); *B32B 27/08* (2013.01); *B32B 27/18* (2013.01); *B32B 27/306* (2013.01); *B32B 27/32* (2013.01); *B32B 27/34* (2013.01); *B29K 2023/12* (2013.01); *B29K 2105/0097* (2013.01); *B32B 2250/05* (2013.01); *B32B 2250/24* (2013.01); *B32B 2307/518* (2013.01); *B32B 2307/7244* (2013.01); *B32B 2307/7246* (2013.01); *B32B 2439/70* (2013.01); *B32B 2597/00* (2013.01)

(58) Field of Classification Search
CPC . B29C 48/912; B29C 48/9185; B29C 48/919; B29C 48/185; B29C 48/3363; B32B 1/08; B32B 27/08; B32B 27/34; B32B 2250/05; B32B 2439/70; B32B 2597/00; B32B 27/18; B32B 27/306; B32B 27/32; B32B 2250/24; B32B 2307/518; B32B 2307/7244; B32B 2307/7246; B32B 2307/304; B32B 7/12; B65D 65/40; B29K 2023/12; B29K 2105/0097; B29K 2023/086; B29K 2077/00; B29K 2995/0067; B29L 2023/001
See application file for complete search history.

(56) References Cited

U.S. PATENT DOCUMENTS

| | | | |
|---|---|---|---|
| 2005/0112247 A1* | 5/2005 | Stalberg | A22C 13/0013 426/135 |
| 2009/0269580 A1 | 10/2009 | Shiba | |
| 2016/0200030 A1 | 7/2016 | Zuribia | |
| 2018/0042311 A1 | 2/2018 | Carraro | |
| 2018/0111359 A1 | 4/2018 | Komro | |
| 2021/0260856 A1* | 8/2021 | Nakanishi | B32B 27/36 |

FOREIGN PATENT DOCUMENTS

| | | |
|---|---|---|
| MX | 2008007862 | 9/2008 |
| MX | 2012010117 | 11/2012 |
| MX | 2012013991 | 12/2012 |
| MX | 2013003356 | 6/2013 |
| MX | 2014016023 | 4/2016 |
| MX | 2016005518 | 7/2016 |
| MX | 2016005520 | 7/2016 |
| MX | 2017007123 | 8/2017 |
| MX | 2017012469 | 1/2018 |
| MX | 2017009640 | 9/2018 |

OTHER PUBLICATIONS

Harper, Douglas. "Etymology of additive." Online Etymology Dictionary, https://www.etymonline.com/word/additive. Accessed Oct. 6, 2023. (Year: 2023).*

Wypych, George. (2016). Handbook of Fillers (4th Edition)—2.1.37 Cristobalite. ChemTec Publishing. Retrieved from https://app.knovel.com/hotlink/pdf/id:kt0111AYG6/handbook-fillers-4th/cristobalite (Year: 2016).*

* cited by examiner

PROCESS FOR OBTAINING A METAL-FREE COEXTRUDED BI-ORIENTED OF 7 LAYERS FILM FOR PACKAGING BY TRIPLE-BUBBLE PROCESS USED FOR STERILIZATION PROCESSES UP TO 135° C

OBJECT OF THE INVENTION

The object of the present invention is to provide a process of obtaining a bi-oriented co-extruded film of 7 layers by triple bubble process for autoclave sterilization processes, so unlike the current existing materials for food sterilization, the present invention does not require an individual manufacturing process of each sheet and subsequent lamination, but it is manufactured in a single step, in addition no metal compound is included in its composition, and provides a shelf life of more than a year in food products that are packaged in the process of sterilization (retort) inside the film.

BACKGROUND

The present invention describes a co-extruded film that improves the shelf life of shelf foods. This reduces food waste, favoring its durability and food quality, allowing the consumer to store their food in optimal conditions for a longer period.

Regarding the state of the art, documents such as the number US2018042311 were found, which refers to a high-barrier oriented PET film that includes one or more layers of PET that form a core of the PET film and one or more outer layers of a dispersed nylon containing PET positioned in the core.

Similarly, document MX2014016023 describes a bi-oriented, co-extruded and low-thickness film, with a layer composition that gives it the property of being a high barrier to gases and manufactured by the process of co-extrusion of three bubbles that gives it the property of, when thermo-formed, guarantee a uniform thickness distribution in the walls, base, folds and corners of the tray formed, thus saving at least 50% plastic without reducing its gas barrier and puncture resistance.

On the other hand, document number MX2012010117, refers to a high-barrier bio-based metallized film, such as PLA or PHA that has an adhesion layer coated or co-extruded with the bio-based film and a metal oxide is arranged on the adhesion layer. The adhesion layer can be a co-extruded polyethylene terephthalate, polyamide, polyglycolic acid or ethylene-vinyl alcohol. The adhesion layer may have an EVOH coating, a nylon/EVOH mixture, PVOH, PVOH/EAA mixtures or a printer.

Likewise, the document number MX2017009640 was found, which consists of a polymer mixture composition comprising 78-92% weight of a homopolymer or ethylene copolymer, 3-10% weight of a polyamide homopolymer, 5-10% weight of polyethylene grafted with maleic anhydride (MAgPE) and 0-2% weight of antistatic compound on the total weight of the polymer mixture composition, in combination with suitable additives.

Another document, number MX2017012469, in which multi-layer films that include a top layer fixed to a co-extruded film are provided. The co-extruded film includes at least a first structural layer of polyamide, a sealing layer and a first junction layer that is arranged between the first structural layer of polyamide and the sealing layer, in which the co-extruded film is substantially free of adhesive. Packages including multi-layer films and sterilization methods are also provided.

There is another document number MX2017007123, invention that provides a multilayer structure comprising a layer of polyolefin functionalized with maleic anhydride applied to a metal-containing layer. Packaging comprising the multilayer structure is also provided.

Another of the technologies found corresponds to document number MX2012013991, invention describing a multi-layer film comprising an upper layer (A), at least one intermediate layer (B), and a lower layer (C) stacked in this order, where the intermediate layer (8) comprises a composition (b1) or a composition (b2) below, and the top layer (A) and the bottom layer (C) each comprises independently an ethylene polymer and/or a propylene polymer: Composition (b1): a composition comprising a propylene polymer (p1) that has a melting point in the range of 140 to 165° C. measured by differential scanning calorimetry and a melting flow rate (MFR; ASTM D 1238, 230° C., load of 2.16 kg) in the range of 0.1 to 20 g/10 minutes, a random copolymer of propylene-a-olefin (r1) that has a molecular weight distribution in the range of 1.0 to 3.5 determined by gel permeation chromatography (GPC) and a melting point in the range of 90 to 125° C. measured by differential scanning calorimetry, and 30% to 60% weight of an ethylene-based elastomer (where the sum of the content of the propylene polymer (p1), the random copolymer of propylene-a-olefin (r1), and the ethylene-based elastomer is 100% weight) (when the middle layer (B) is composed of the composition (b1), the ratio of the content of the propylene polymer (p1) in the entire multi-layer film to the sum of the content of the propylene (p1) and the random copolymer of propylene-to-olefin (r1) in the entire multi-layer film is 0.1 to 0.35).

Similarly there is a document with number US1996015010, invention in which a film is provided where at least one layer comprises polymer, with a molecular majority derived from propylene, which has a rate of transmission of water vapor less than or equal to approximately ($-7.4428$ g×mu m/m2×day×% crystallinity of the polymer) (% crystallinity of the polymer)+627.32 g×mu m/m<2>×day, or ($-0.0189$ g×mil/100 in <2>×day×% polymer crystallinity) (% polymer crystallinity)+1.593 g×mil/100 in <2>×day.

Document number MX2016005520 describes a flexible packaging formed of a first and second flexible materials that can be laminated. Flexible materials may include a gas barrier layer. The properties of the gas barrier can be selected in a way that is suitable for short shelf-life products or fluid products that have a low susceptibility to dissolution or water loss. The association of destination markings with at least one flexible material from which a flexible packaging will be assembled, before, during, or after the assembly and/or filling of a volume of product from the flexible packaging, facilitates the timely sorting and delivery of the flexible packaging to an intended destination.

Likewise, document number MX2016005518 was found, which describes a method for sealing and cutting a flexible material to manufacture a flexible container comprising a volume of product, and, at least, a volume of structural support that may include introducing, at least, two flexible materials into a sealing apparatus comprising a sealing surface and an opposite anvil surface; putting in contact a seam region of at least two flexible materials with the sealing surface to form a seal in the seam region and cut the seal to form a seam in a single unit operation. The seal defines one or both, of at least one, portion of a product volume limit and at least one portion of a limit of, at least one, structural support volume.

Another of the inventions found corresponds to document number MX2012001097, which consists of a co-extruded multilayer film that includes a core layer that includes a polyamide; two intermediate layers each including a vinyl ethylene-alcohol copolymer; a first and second outer layer each including an olefin copolymer or an amorphous cyclic olefin copolymer; and two coupling layers each adhering an intermediate layer to a respective external layer; the vinyl ethylene-alcohol copolymer of the first intermediate layer has a % in mole of ethylene at least 5 times greater than the % in mole of ethylene of vinyl ethylene-alcohol copolymer of the second intermediate layer. An aseptic packaging includes a sterilized food product, and a sterilized bag in which the sterilized food product is placed, the sterilized bag includes the film of the invention. A method for making an aseptic packaging is also described.

Also document number MX2013003356, which consists of a method to prepare a food dish while simultaneously cooking a food with rice, characterized by the food being seasoned or flavored by placing the food and ingredients of seasoning or flavoring inside a cooking bag, sealing the cooking bag, placing the sealed cooking bag in a cooking apparatus, and characterized in that the rice is placed in the cooking apparatus either before or after the cooking bag was put into the cooking apparatus and the food and rice were cooked together. A cooking kit to use with the method comprising a cooking bag that comes with a sachet containing ingredients and seasoning or flavoring.

Another document found, number MX2008007862, describes an invention that provides bags for the preparation of food with high temperature ventilation that are used to pack food products for storage, transportation and preparation, and methods to make and use them; bags for the preparation of food with high temperature ventilation are composed of a sealed end, an open end, and at least one side wall that is composed of a first thermoplastic film that has a vent, and a vent seal that is composed of a second thermoplastic film; the ventilation seal is merged to the side wall by means of a non-adhesive seal, thus closing the vents; at high temperatures the ventilation seal is at least partially detached from the side wall, thus opening the vents; the opening of at least one ventilation does not depend on the accumulation of internal fluid or gas pressure, and is compatible with vacuum packing techniques; ventilated cooking techniques that allow a golden and crispy appearance of beef and chicken without having to manipulate the bag for food preparation during cooking are provided.

A document with the number US2004032545 was also found, consisting of a monolayer film of a polymer mixture of a first component selected from the group consisting of a polymer containing ethylene, the first component is present in a weight amount of the film of about 60% to about 1%, the first component has a first melting point temperature determined by DSC, a second selected component of the group consisting of polymers containing propylene and polymers containing methyl pentene, the second component being present in an amount by weight of the film of approximately 99% to approximately 40%, the second component having a second melting point temperature determined by DSC; and the film is able to withstand steam sterilization at a temperature of about 100° C. to about 130° C.

Similarly, a document corresponding to the number EP3774336A1 was found, which describes an autoclavable film that has a sealing layer, a first junction layer, a barrier layer, a second junction layer and a skin layer. The sealing layer, the outer layer, the first junction layer and the second junction layer each comprise a polymer that has a melting point <121° C. The sealing and coating layers comprise the polymer at 5-80% by weight; the junction layers comprise the polymer at 50-100% by weight. The barrier layer comprises PVDC and/or amorphous polyamide. A packaging item is manufactured from the autoclavable film. A retort process involves placing a product on the packaging item, sealing the closed item, and heating the packaged product to a temperature of at least approximately 121° C. for ≥30 minutes.

Similarly document number CN211544435U was found, a utility model describing a high tensile strength sterilization packaging bag in the technical field of sterilization bags. The packing bag comprises a bag body and a layer of glue, the glue spreads evenly on the left side edge and the lower edge of the bag body; the body of the bag comprises: a bag body, a high tensile strength part, an easy-opening part and an opening belt are arranged; the part of high tensile strength is formed by combining a plurality of structured layers; the easy-to-open part is arranged on the left side of the centerline of the high tensile strength part; the opening belt is connected with the high tensile strength part; where the high tensile strength part comprises a storage layer and a high tensile strength layer; the composite film comprises a first high barrier film of EVOH, a first thermal insulation coating of tin oxide and nano indium, a first layer of Tyvek, woven fabric of PP, a second high barrier film of EVOH and a second thermal insulation coating of tin oxide and nano indium. The first thermal insulation coating of indium oxide and nanometric tin is placed on top of the first high barrier film of EVOH, the first layer of Tyvek is placed on the first thermal insulation coating of indium oxide and nanometric tin, the woven fabric of PP is placed over the first layer of Tyvek, and the user can use and open the packing bag more conveniently and quickly through the opening strap and the easy-to-open part.

Finally, the document number CN111453169A was found, an invention describing a high barrier woven bag. The high-barrier woven bag is prepared by processing a high-barrier composite film with a five-layer structure of woven fabric, a layer of polymer resin, an adhesive layer of polyurethane, a biaxially oriented polypropylene film and a layer of high-barrier material, a synergistic effect is achieved by the layers, so that the barrier and sealing performance of the woven bag is improved, the complete sealing state is achieved, and the woven bag can be effectively waterproof, moisture-proof, mold and bug proof; when woven bag coating composite equipment is used to prepare the high-barrier composite film, the high-barrier composite film is not composed sequentially from the bottom up, the polymer resin layer is formed on the top surface of the woven fabric in the first place, a layer of high-barrier material is formed on the upper surface of the biaxially oriented polypropylene film, and the woven fabric and biaxially oriented polypropylene film are carried out synchronously, so that production efficiency is greatly improved; and the composed equipment of coating woven bags successfully produces the high barrier composite film with the five-layer structure, the composite effect is good, and the barrier property of the woven bag improves favorably.

DETAILED DESCRIPTION OF THE INVENTION

The present invention provides a process for obtaining a bi-oriented co-extruded film of 7 layers by triple bubble process for autoclave sterilization processes. Currently, the materials (films) for food sterilization are laminated packaging of different materials, which are extruded individually and in caliber of 3 to 7 thousandths total, using multilayer lamination processes, and therefore more complex processes.

The present invention does not require the individual manufacturing process of each sheet and subsequent lamination, so the process is shorter and with less risks.

The risks that are avoided with the process of the present invention are: delamination, use of adhesives, space and time for rest or curing, contamination in all these subprocesses. By having the process in line and obtaining the material in tubular form the inner part is not in direct contact with any material surface where it can be contaminated, unlike what happens in a flat lamination, in addition, it grants shelf lives of at least one year to the food products that are packed inside said film in the process of sterilization (retort), these products include but are not limited to meat foods, vegetables, legumes, among others, so their main application is in food packaging where refrigeration or freezing is not required for preservation.

In addition, the film object of the present invention, contributes to reduce food waste since it can keep food in appropriate conditions during a long shelf life, and provides a transparent material, without printing, which is ideal for use with label.

Figure 4:
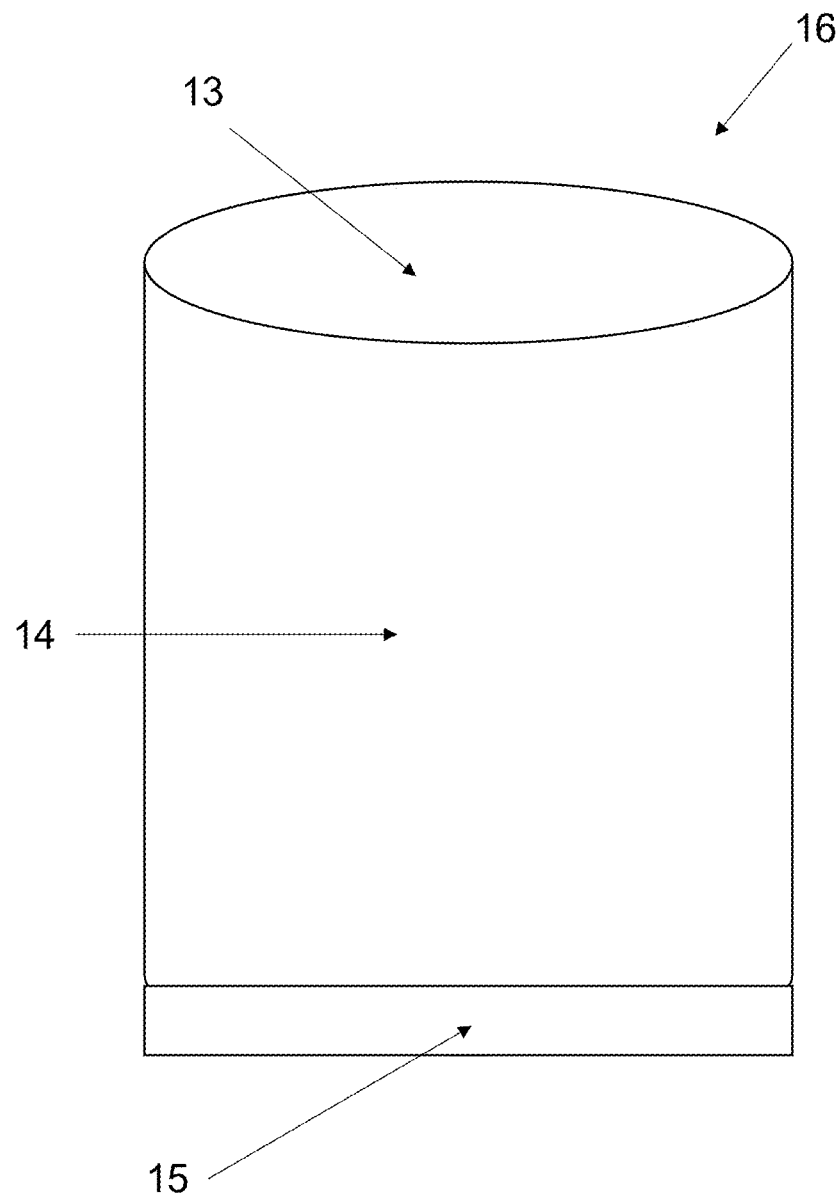
FIG. 4 shows a side view of a bag formed by the film object of the present invention.

This film allows to have a first layer of contact with food, a second layer of barrier and a third outer layer; where the first layer of contact with food has an excellent sealing strength so that its structure allows the film of the present invention, to form packages or bags (16), as shown in FIG. 4, said packaging (16) comprises a body (14) that in its upper part has an opening or mouth and a seal (15) in its lower part, in addition, this first layer of contact with food is resistant to the thermal process and abrasion, provides flexibility, strength, structure and mechanical resistance; on the other hand, the second layer of barrier allows to extend its utility life, and its third outer layer provides high mechanical resistance, strength and shine and is resistant to high temperatures.

Therefore, the present invention provides a film with a wall thickness of 3 to 7 thousandths of an inch, with a very low oxygen permeability, lower than 0.05 $cm^3/m^2$ per day, and a high thermal resistance of up to 135° C., preferably 121° C. for cooking and sterilization processes in autoclave.

Figure 5:
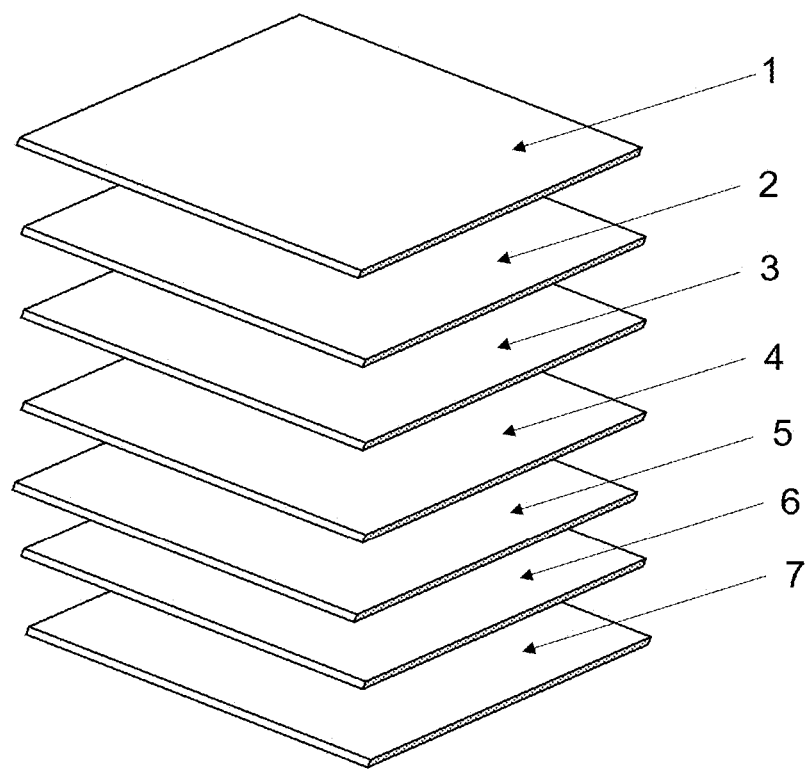
FIG. 5 shows a schematic view of the distribution of layers of the film object of the present invention.

This film is manufactured by a co-extrusion of 7 layers with bi-orientation in triple bubble process, as shown schematically in FIG. 5, it is composed of three layers of polypropylene (1, 2 and 3), a first layer of adhesives and additives (4), a first layer of polyamide (5), a layer of ethylene-vinyl-alcohol (6) and a second layer of polyamide (7), these layers are completely merged in the film object of the present invention.

The film comprises 40 to 50% polyamide, 30 to 40% polypropylene, 8 to 10% ethylene-vinyl-alcohol (EVOH), and 5% to 7% of at least one adhesive and at least one additive, where the adhesive has a fluid index of between 2.0 and 4.0 g/10 min, and is chosen from the group comprising those obtained from n-butane, preferably the adhesive is between 1 to 3% maleic anhydride; and the additive has polypropylene with a density of between 0.8 to 0.95 $g/cm^3$ and specific gravity of up to 1.05 $g/cm^3$ as a vehicle, said additive is chosen from the group of cristobalites and preferably the additive comprises 1 to 3% of Cristobalite Flux.

It should be noted that co-extrusion is a process that allows combining the properties of different polymers into a single structure or product that has improved properties. Thus, it is possible to improve or combine properties such as puncture resistance of the packaging, heat sealing, appearance, permeability, etc., and material consumption is optimized by using recycled material or lower cost materials for the internal layer(s).

Co-extrusion is applied in the extrusion of sheets and films, mainly for food packaging, pharmaceuticals, etc., as well as in the extrusion of tubes, and in some cases for extrusion of profiles.

The process of retorting or sterilization is a physical technique of preserving food hermetically packaged in a container and subjected to high temperatures for a period to completely destroy its microorganisms, pathogens or not, and spores. In this process temperatures above 100° C. are applied, in the order of 115 to 121° C. for varied periods of time and its objective is the destruction of all viable organisms that can be counted by a proper counting or cultivation technique and their spores, as well as those that can deteriorate the food, providing a shelf life of more than 6 months. The speed of heat penetration into a food influences the treatment time and is defined as the amount of heat transferred per unit of time.

Figure 1:
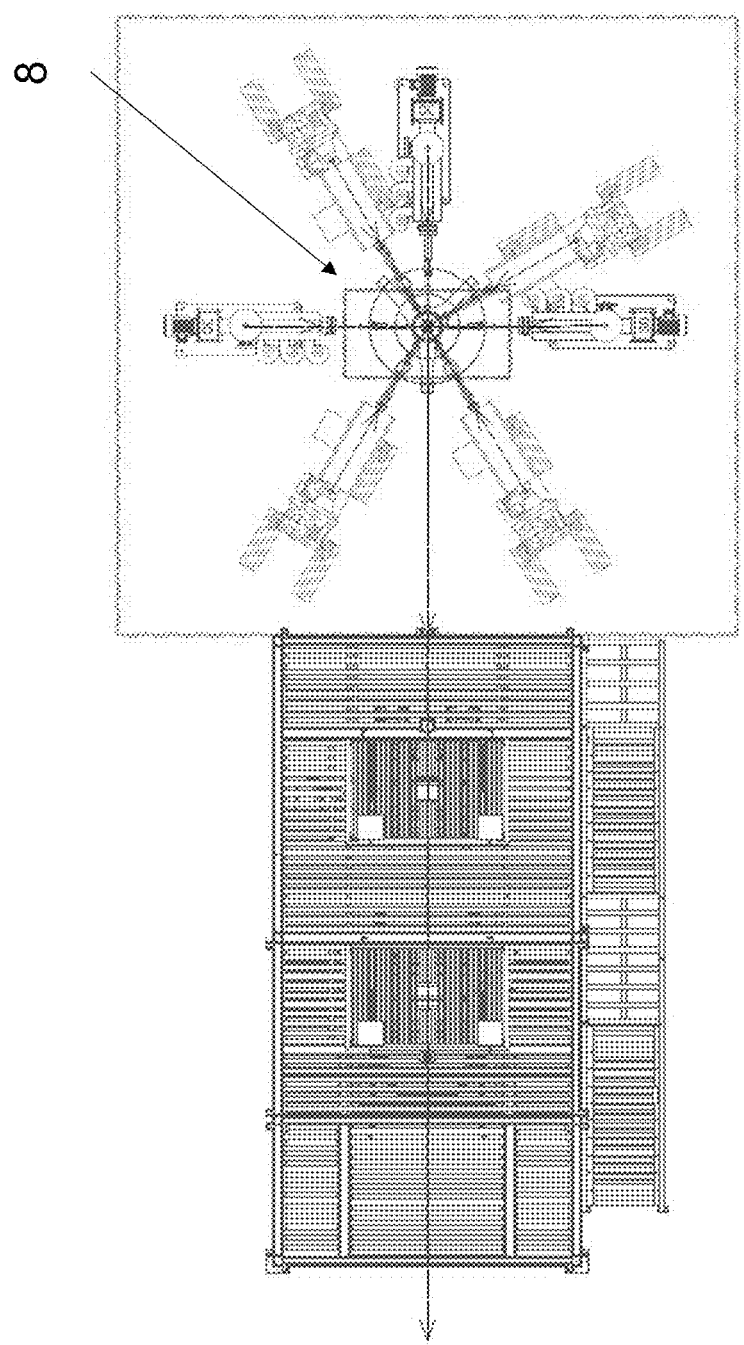
FIG. 1 shows a top view where the flow of the materials is detailed, the heads of the extruders are observed until the exit in the winder.
Figure 6:
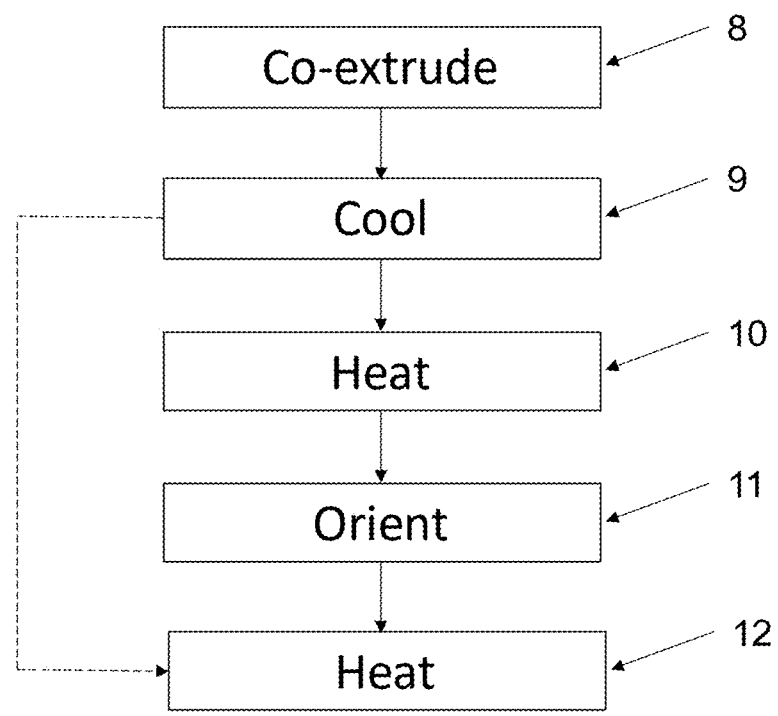
FIG. 6 shows the process object of the invention.

As shown in FIG. 6, the process of the present invention comprises the stages of:

a) Co-extrude (8) at a temperature of between 5-15° C. a 7-layer tubular strip with a tubular central head, as shown in FIG. 1, in a first bubble, where said tubular strip has a dimension of 20 to 350 mm. The 7 layers are individually extruded by extruders that feed each of the materials, where these materials comprise three layers of polypropylene (1)(2)(3), a first layer of adhesives and additives (4), a first layer of polyamide (5), a layer of ethylene-vinyl-alcohol (6) and a second layer of polyamide (7), and where the adhesive has a flux index of between 2.0 and 4.0, preferably the adhesive is maleic anhydride, and the additive has as a vehicle polypropylene with density between 0.8-0.95 $g/cm^3$ and specific gravity of up to 1.05 g/cm$^3$, said additive is chosen from the group of cristobalites, preferably the additive comprises 1 to 3% of Cristobalite Flux, to obtain a co-extruded tubular strip.

b) Cool (9) the co-extruded tubular strip in stage a) by immersing it in water until said strip reaches between 5° to 12° C., to obtain an amorphous multilayer strip, that is not crystalline.

c) Heat (10) the amorphous tubular multilayer strip obtained in stage b) to a temperature of 70 to 75° C.

d) Orient (11) biaxially the tubular multilayer strip heated in stage c) in a second expansion bubble at a temperature of 68 to 75° C. to obtain an amorphous bi-oriented primary film.

e) Heat (12) the amorphous bi-oriented primary film obtained in stage d) until reaching 140 to 150° C. to stabilize it and eliminate thermal shrinkage and possible elongation to obtain a metal-free film for packaging, where said film is tubular.

Figure 2:
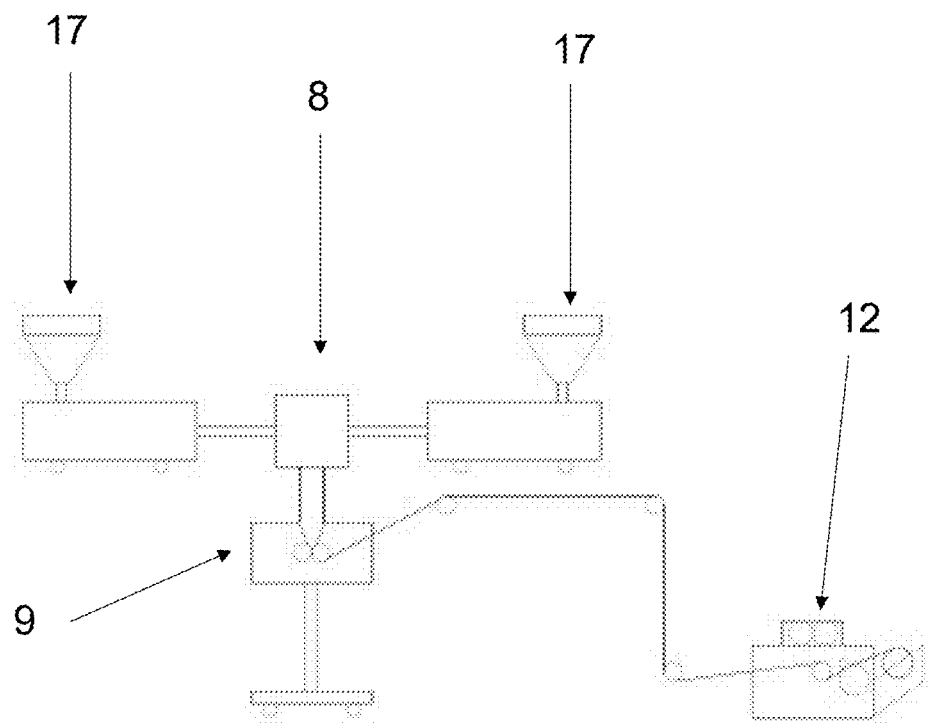
FIG. 2 shows a schematic side view of one of the preferred modalities of the invention, balloon co-extrusion, where the workstations are reduced, and where the location of the feeding hoppers is shown (17).
Figure 3:
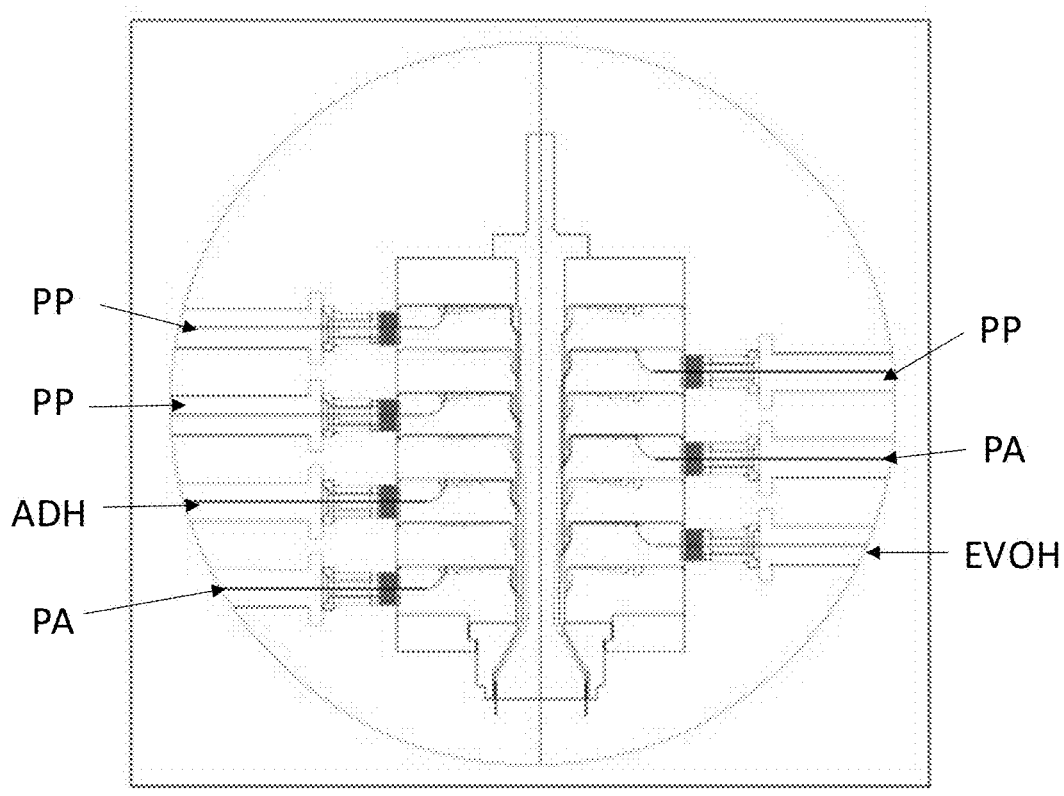
FIG. 3 shows a front view of the co-extrusion dice, where it is observed how the resins of each extruder are fed and joined at the bottom, which is the outlet opening; where PP: Polypropylene, PA: Polyamide, ADH: Adhesives and additives and EVOH: Ethylene-Vinyl-Alcohol.

In a preferred modality of the invention, stage c) and d) are optional in the process, as shown in FIG. 2, after stage a), cools b) and passes to stage e), having a balloon co-extrusion process like the "alternate" process of this same document.

Figure 7:
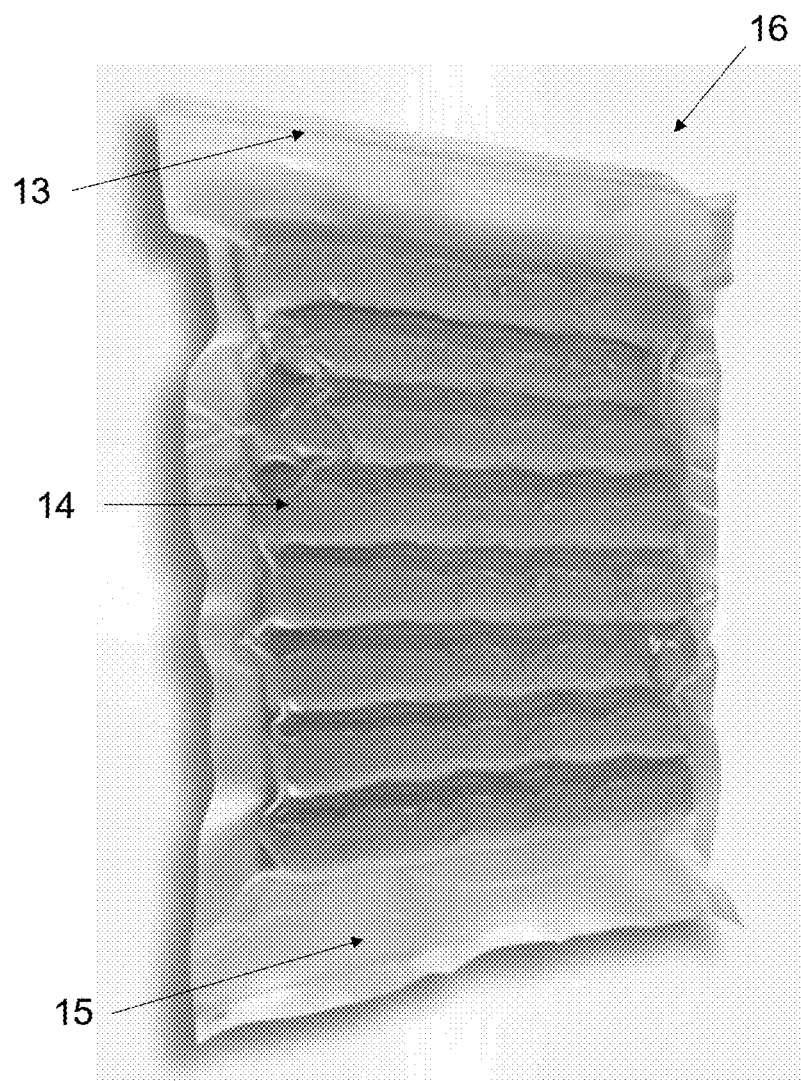
FIG. 7 shows a photograph of an isometric side view of the film object of the invention with food inside (sausages).

Once the tubular film is obtained at the end of stage e), the user places the product inside the bag, closes it and seals it with temperature and pressure, and places it inside an autoclave for processing, obtaining food products such as the one shown in FIG. 7.

Example 1. Barrier Studies of the Film Object of the Present Invention

According to the Report/Service Number 903-19 of the Center for Research and Applied Chemistry, where the oxygen and water vapor permeability of the material is evaluated, the following results are observed:

Oxygen transmission, according to ASTM-D-3985-2017 (using CEF-60/CCQ-028-1 coulometric sensor:
cm$^3$/m$^2$·day=Values below the limit of the equipment, which is 0.05 cm$^3$/m$^2$·day
g/100 in2·day=Not reported for being below the equipment limit.

Water vapor, according to ASTM-F-1249-13 (using CEF-60/CCQ-038 infrared sensor):
Transmission in g/m$^2$·day=0.93094
Transmission in g/100 in2·dia=0.060065

This proves a very high oxygen barrier, comparable to an ALOX PET (12)/NY (25)/W-RCPP (100) laminated material that offers a value only specified as less than 1.0.

Example 2. Shelf-Life Studies of the Film of the Present Invention

According to the report number MB-20-097 of the PIT Technology Center, in the Microbiology Laboratory, of Sigma Foods, when samples with 1 year of life are analyzed, it gives a real shelf in extreme conditions (T>50° C./RH Environment/397 days).

In table 1, different samples are shown, those marked as "key 3, 4 and 5" correspond to the present invention, without observing any difference vs the samples that do not have this key, and that correspond to products in regular laminated containers.

TABLE 1

Shelf-life assessment of various samples.

| | Internal Code | MA | CT | E. coli | BAL UFC/g | Fungus | Yeasts | Salmonella spp Presence/Absence in 25 g | Listeria monocytogenes |
|---|---|---|---|---|---|---|---|---|---|
| NTR 708 CAATA9.18.19 Bean | 09-249 | <10 | <10 | <10 | <10 | <10 | <10 | Absence | Absence |
| NTR 708 CAATA9.18.19 Bean | 09-250 | <10 | <10 | <10 | <10 | <10 | <10 | Absence | Absence |
| Code 1 pork meat test | 09-252 | <10 | <10 | <10 | <10 | <10 | <10 | Absence | Absence |
| Code 2 pork meat test | 09-253 | <10 | <10 | <10 | <10 | <10 | <10 | Absence | Absence |
| Code 3 Aug/23$^{rd}$ pork meat bag test | 09-254 | <10 | <10 | <10 | <10 | <10 | <10 | Absence | Absence |
| Code 4 Aug/23$^{rd}$ pork meat bag test | 09-255 | <10 | <10 | <10 | <10 | <10 | <10 | Absence | Absence |
| Code 5 July/5$^{th}$ standard sample pork meat test | 09-256 | <10 | <10 | <10 | <10 | <10 | <10 | Absence | Absence |
| Methodology | | B | C | C | H | G | G | M | O |

Example 3. Physical-Mechanical Evaluation of the Film of the Present Invention

Tests are performed to determine the seal strength of the present invention, in a GBPI brand fixed bar sealing equipment, where it has a temperature of 220° C., for 1 sec and with a pressure of 35 pounds per square inch.

The method used for the measurement of the seal force is ASTM F88, in which the test tubes are placed on a dynamometer and a force is exerted at 180°, measuring the force required to separate the adhered films, according to FIG. 7.

With this technique the results of these tests are between 16 and 22 lb/in$^2$, with an average of 19 lb/in$^2$.

Figure 8:
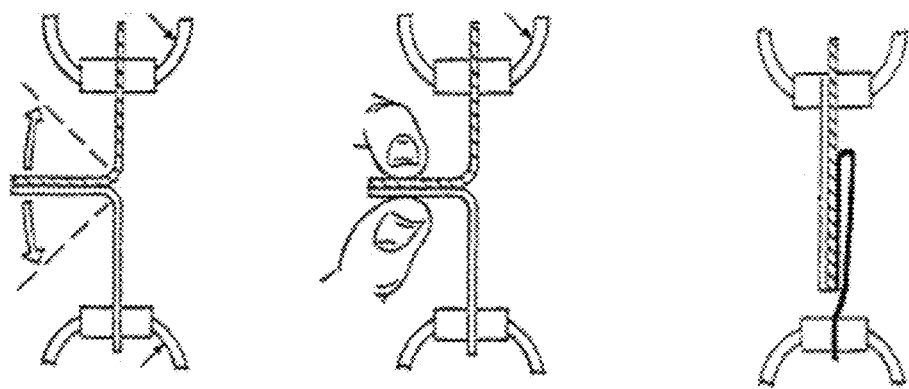
FIG. 8 shows a diagram of the method used for measuring the seal force of the film according to ASTM F88. Where A) is the unsupported technique, B) is supported 90° C. by hand and C) is the technique supported at 180° C., the arrows indicate the fastening element (grip) within each technique.
Figure 9:
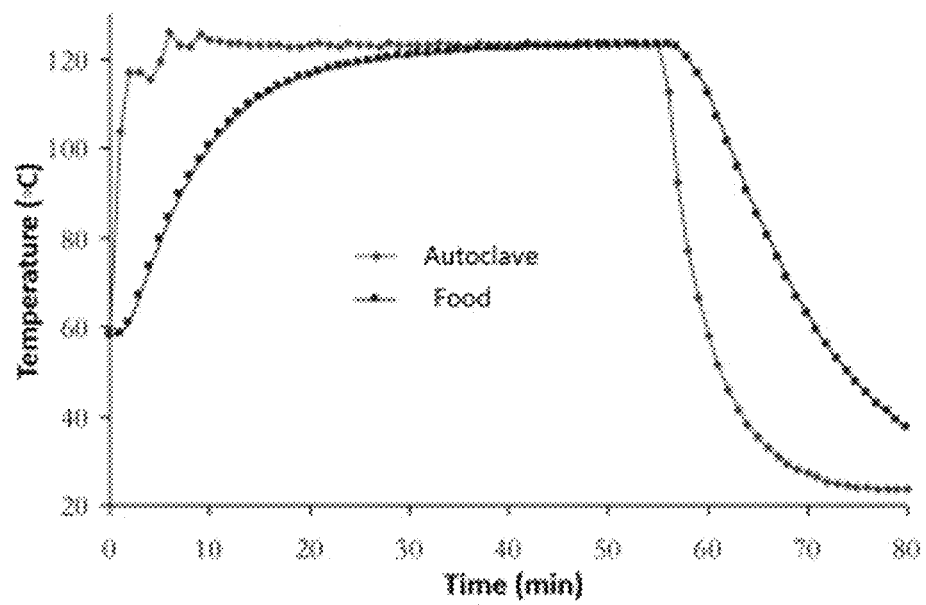
FIG. 9 shows a graph with the optimum operating temperature.

Tests were done to determine the optimal operating temperature, a curve like the one shown in FIG. 8 was generated:

With which it is verified that the material resists 121° C. for a period of 30 min, approximately, and with which the sterilization of the food is achieved. The conditions also include a back pressure in the autoclave that is 2.0 kgf.

Having sufficiently described my invention, I consider as a novelty and therefore claim as my exclusive property, what is contained in the following claims:

1. A 7-layers co-extruded bi-oriented film for a food package, the 7-layers co-extruded bi-oriented film comprising:
   a first layer made of polypropylene;
   a second layer made of polypropylene adjacent to the first layer;
   a third layer made of polypropylene adjacent to the second layer;
   a fourth layer made of at least one adhesive and at least one additive;
   a fifth layer made of polyamide adjacent to the fourth layer;
   a sixth layer made of ethylene-vinyl-alcohol (EVOH), the sixth layer adjacent to the fifth layer; and
   a seventh layer made of polyamide adjacent to the sixth layer;
   wherein the adhesive has a flow index between 2.0 and 4.0 g/10 min and consists of n-butane and maleic anhydride;
   wherein the additive is cristobalite;
   wherein the 7-layers co-extruded bi-oriented film comprises 40 to 59% weight of the polyamide, 30 to 40% weight of the polypropylene, 8 to 10% weight of the ethylene-vinyl-alcohol (EVOH), 5 to 7% weight of the at least one adhesive and the at least one additive;
   wherein the film includes a first side and a second side opposite to the first side;
   wherein the first layer is located on the first side of the film and the seventh layer is located on the second side of the film;
   wherein the film is free of metals.

2. The 7-layers co-extruded bi-oriented film for packaging according to claim 1, wherein the film has a thermal resistance of up to 135° C.

3. The 7-layers co-extruded bi-oriented film for packaging according to claim 2, wherein the film has a thermal resistance of 121° C.

4. The 7-layers co-extruded bi-oriented film for packaging according to claim 1, wherein the film has a caliber of 3 to 7 thousandths of an inch.

5. The 7-layers co-extruded bi-oriented film for packaging according to claim 1, wherein the film has an oxygen permeability of less than 0.05 $cm^3/m^2$ per day.

6. The 7-layers co-extruded bi-oriented film for packaging according to claim 1, wherein the film has a water vapor transmission of 0.930946 $g/m^2$ per day.

7. The 7-layers co-extruded bi-oriented film for packaging according to claim 1, wherein the film has a water vapor transmission of 0.060065 $g/100\ in^2$ per day.

8. The 7-layers co-extruded bi-oriented film for packaging according to claim 1, wherein the film has a shelf life greater than or equal to one year for a food packed within said film by a retort process.

9. The 7-layers co-extruded bi-oriented film for packaging according to claim 1, wherein the film has a seal force of 16 to 22 $lbs/in^2$.

10. The 7-layers co-extruded bi-oriented film for packaging according to claim 1, wherein the film is a food packaging film used for sterilization processes.

11. A 7-layers co-extruded bi-oriented film for a food package, the 7-layers co-extruded bi-oriented film consisting of:
   a first layer made of polypropylene;
   a second layer made of polypropylene adjacent to the first layer;
   a third layer made of polypropylene adjacent to the second layer;
   a fourth layer made of at least one adhesive and at least one additive;
   a fifth layer made of polyamide adjacent to the fourth layer;
   a sixth layer made of ethylene-vinyl-alcohol (EVOH), the sixth layer adjacent to the fifth layer; and
   a seventh layer made of polyamide adjacent to the sixth layer;
   wherein the adhesive has a flow index between 2.0 and 4.0 g/10 min and is selected from the group consisting of n-butane and maleic anhydride;
   wherein the additive is cristobalite;
   wherein the 7-layers co-extruded bi-oriented film comprises 40 to 59% weight of the polyamide, 30 to 40% weight of the polypropylene, 8 to 10% weight of the ethylene-vinyl-alcohol (EVOH), 5 to 7% weight of the at least one adhesive and the at least one additive;
   wherein the film includes a first side and a second side opposite to the first side;
   wherein the first layer is located on the first side of the film and the seventh layer is located on the second side of the film;
   wherein the film is free of metals.

* * * * *